United States Patent
Chattopadhyay et al.

(10) Patent No.: US 9,577,848 B1
(45) Date of Patent: Feb. 21, 2017

(54) DECISION FEEDBACK EQUALIZER

(71) Applicant: SILAB TECH PVT. LTD., Bengaluru, Karnataka (IN)

(72) Inventors: Biman Chattopadhyay, Bengaluru (IN); Ravi Mehta, Bengaluru (IN); Rajesh V., Bengaluru (IN)

(73) Assignee: SILAB TECH PVT. LTD., Bengaluru, Karnataka (IN)

( * ) Notice: Subject to any disclaimer, the term of this patent is extended or adjusted under 35 U.S.C. 154(b) by 0 days.

(21) Appl. No.: 14/924,282

(22) Filed: Oct. 27, 2015

(30) Foreign Application Priority Data

Sep. 10, 2015 (IN) .......................... 4794/CHE/2015

(51) Int. Cl.
| | | |
|---|---|---|
| *H03H 7/30* | (2006.01) | |
| *H03H 7/40* | (2006.01) | |
| *H03K 5/159* | (2006.01) | |
| *H04L 25/03* | (2006.01) | |
| *H04B 1/16* | (2006.01) | |

(52) U.S. Cl.
CPC ........... *H04L 25/03057* (2013.01); *H04B 1/16* (2013.01)

(58) Field of Classification Search
CPC ............. H04L 25/03057; H04L 25/062; H04L 25/03146; H04B 1/16
USPC ................ 375/233, 232, 234, 230, 235, 231
See application file for complete search history.

(56) References Cited

U.S. PATENT DOCUMENTS

| | | | | |
|---|---|---|---|---|
| 7,715,474 B2* | 5/2010 | Park et al. | ........ | H04L 25/03146 375/233 |
| 7,792,187 B2* | 9/2010 | Bulzacchelli | ..... | H04L 25/03057 375/231 |
| 2009/0010320 A1* | 1/2009 | Hollis | .............. | H03K 3/356113 375/232 |
| 2013/0259162 A1* | 10/2013 | Qin | ........................ | H04L 25/062 375/317 |
| 2015/0256362 A1* | 9/2015 | Ganzerli | ........... | H04L 25/03057 375/233 |
| 2015/0312062 A1* | 10/2015 | Thakkar | ............ | H04L 25/03057 375/233 |

* cited by examiner

*Primary Examiner* — Phuong Phu
(74) *Attorney, Agent, or Firm* — Sughrue Mion, PLLC

(57) ABSTRACT

A decision feedback equalizer (DFE) includes first through sixth flip-flops, and first and second summer circuits. The first through fourth flip-flops sample an analog input signal received at the first and second summer circuits, detect the logic level of a data bit in the analog input signal and generate the first through fourth compensated signals. The first multiplexer outputs at least one of the first and second compensated signals as a first feedback signal, based on a fourth feedback signal generated by the sixth flip-flop. The second multiplexer outputs at least one of the third and fourth compensated signals as a second feedback signal, based on a third feedback signal generated by the fifth flip-flop. The first and second feedback signals are multiplied by a weight coefficient and fed back to the first and second summer circuit, respectively, to compensate an error in the analog input signal.

26 Claims, 5 Drawing Sheets

DECISION FEEDBACK EQUALIZER

BACKGROUND

Field of the Invention

The present invention generally relates to high-speed data communication, and more particularly, to equalization techniques for high-speed data communication.

Description of the Related Art

In a data communication network, data signals are exchanged between transmitters and receivers at varied transmission rates over transmission channels. With advancement in data communication networks, there is a need for high transmission rates of data signals. However, a data signal transmitted at a high transmission rate is subject to distortion. The data signal may be distorted either by inter-symbol interference (ISI), random noise, or crosstalk. At the receiver, it is difficult to recover the original data bits from the distorted data signal.

A known solution in the art is the use of channel equalizers in the receivers to eliminate the distortion in received data signals. Channel equalizers are either linear or non-linear equalizers. A linear equalizer minimizes the distortion between received and transmitted data signals. However, when the channel distortion is too severe, the linear equalizer tends to enhance the noise in the received data signals. A non-linear equalizer is employed to eliminate distortion in the received data signals for channels with severe channel distortion. An example of a non-linear equalizer is a decision feedback equalizer (DFE), which eliminates the distortion in the received data signals without amplifying noise and crosstalk. The DFE calculates an error, based on the previous bits of the distorted data signal, and subtracts the error from the current bit of the distorted data signal.

The DFE includes summer circuits, decision-making slicer circuits, and a feedback circuit. A summer circuit adds feedback signals to the received data signal. A decision-making slicer circuit samples the received data signal to detect logic levels of data bits in the received data signal and output corresponding binary values. A feedback circuit includes feedback generators, which generate weight coefficients that are multiplied with the previously detected data bits and are fed back to the summer circuit as feedback signals. The weight coefficients are referred to as "taps" and are represented by h1, h2, and so on. For an M-tap DFE, the taps are represented by h1, h2, and so on, till hm. The number of taps required in the DFE increases with an increase in data signal distortion.

The timing paths of the DFE are represented by a unit interval (UI), i.e., a predetermined time interval. The period available for correction of errors in the received data signals is referred to as a "fundamental timing limit" of the DFE. The clock-to-output delays, propagation delays, and set-up times of the summer circuits, the decision-making slicer circuits, and the feedback circuits govern the fundamental timing limit of the DFE. The h1 tap corrects the error in a data bit that arrives at the DFE one UI earlier than a current data bit. The h2 tap corrects the error in a data bit that arrives at the DFE two UIs earlier than the current data bit.

The DFE implemented in a full-rate clock architecture has a fundamental timing limit of one UI. Thus, in the full-rate clock architecture, the propagation delay and the setup time in summer, the decision-making slicer, and the feedback circuits constitute less than one UI. Further, the DFE that is implemented in a half-rate clock architecture has a fundamental timing limit of one UI. However, the DFE that is implemented in the half-rate clock architecture with a technique "loop unrolling" has the fundamental timing limit of two UI.

FIG. 1A shows a conventional DFE 100 for compensating an error in an analog input signal received thereby. The DFE 100 is implemented in a half-rate architecture. The DFE 100 includes first through sixth summer circuits 102a-102f, first through tenth latches 104a-104j, first and second multiplexers 106a and 106b, and first and second feedback generators 108a and 108b. The first through fourth latches 104a-104d and the fifth through eighth latches 104e-104h are referred to as master latches 104a-104d and slave latches 104e-104h, respectively.

The first summer circuit 102a receives the analog input signal and a first weighted feedback signal, and generates a first intermediate signal. The second summer circuit 102b receives the analog input signal and a second weighted feedback signal, and generates a second intermediate signal. The third summer circuit 102c is connected to the first summer circuit 102a for receiving the first intermediate signal and a first offset voltage value, and generating a third intermediate signal. The fourth summer circuit 102d is connected to the first summer circuit 102a for receiving the first intermediate signal and a second offset voltage value, and generating a fourth intermediate signal.

The fifth summer circuit 102e is connected to the second summer circuit 102b for receiving the second intermediate signal and the first offset voltage value, and generating a fifth intermediate signal. The sixth summer circuit 102f is connected to the second summer circuit 102b for receiving the second intermediate signal and the second offset voltage value, and generating a sixth intermediate signal. The first and second offset voltage values are predetermined voltage values added to the first and second intermediate signals. The first and second offset voltage values have the same voltage values, but opposite polarities. The technique of adding such predetermined voltage values to the first and second intermediate signals is referred to as loop unrolling. Implementation of the loop unrolling technique eliminates the settling time required by first and second weighted feedback signals.

The first latch 104a has an input terminal connected to the third summer circuit 102c for receiving the third intermediate signal, a clock input terminal for receiving a first clock signal, and an output terminal for outputting a first compensated signal. The second latch 104b has an input terminal connected to the fourth summer circuit 102d for receiving the fourth intermediate signal, a clock input terminal for receiving the first clock signal, and an output terminal for outputting a second compensated signal. The third latch 104c has an input terminal connected to the fifth summer circuit 102e for receiving the fifth intermediate signal, a clock input terminal for receiving a second clock signal, and an output terminal for outputting a third compensated signal. The fourth latch 104d has an input terminal connected to the sixth summer circuit 102f for receiving the sixth intermediate signal, a clock input terminal for receiving the second clock signal, and an output terminal for outputting a fourth compensated signal.

The fifth latch 104e has an input terminal connected to the output terminal of the first latch 104a for receiving the first compensated signal, a clock input terminal for receiving the second clock signal, and an output terminal for outputting a delayed first compensated signal. The sixth latch 104f has an input terminal connected to the output terminal of the second latch 104b for receiving the second compensated signal, a clock input terminal for receiving the second clock signal, and an output terminal for outputting a delayed second compensated signal.

The first multiplexer 106a has first and second input terminals connected to the output terminals of the fifth and sixth latches 104e, and 104f for receiving the delayed first and second compensated signals, respectively, a select terminal for receiving a first select signal, and an output terminal for outputting a first feedback signal. The ninth latch 104i has an input terminal connected to the output terminal of the first multiplexer 106a for receiving the first feedback signal, a clock input terminal for receiving the second clock signal, and an output terminal for outputting a delayed first feedback signal. The first feedback generator 108a has an input terminal connected to the output terminal of the ninth latch 104i for receiving the delayed first feedback signal, multiplying the delayed first feedback signal with a third offset voltage value, and an output terminal for generating the first weighted feedback signal. The output terminal of the first feedback generator 108a is connected to the first summer circuit 102a. Thus, the first weighted feedback signal compensates the error in the analog input signal received at the first summer circuit.

The seventh latch 104g has an input terminal connected to the output terminal of the third latch 104c for receiving the third compensated signal, a clock input terminal for receiving the first clock signal, and an output terminal for outputting a delayed third compensated signal. The eighth latch 104h has an input terminal connected to the output terminal of the fourth latch 104d for receiving the fourth compensated signal, a clock input terminal for receiving the first clock signal, and an output terminal for outputting a delayed fourth compensated signal.

The second multiplexer 106b has first and second input terminals connected to the output terminals of the seventh and eighth latches 104g and 104h for receiving the delayed third and fourth compensated signals, respectively, a select terminal connected to the output terminal of the ninth latch 104i for receiving the delayed first feedback signal as a second select signal, and an output terminal for outputting a second feedback signal. The tenth latch 104j has an input terminal connected to the output terminal of the second multiplexer 106b for receiving the second feedback signal, a clock input terminal for receiving the first clock signal, and an output terminal for outputting the delayed second feedback signal. The first multiplexer 106a receives the delayed second feedback signal as the first select signal. The second feedback generator 108b has an input terminal connected to the output terminal of the tenth latch 104j for receiving the delayed second feedback signal, multiplying the delayed second feedback signal with the third offset voltage value, and an output terminal for generating the second weighted feedback signal. The output terminal of the second feedback generator 108b is connected to the second summer circuit 102b. Thus, the second weighted feedback signal compensates the error in the analog input signal. The first and second clock signals have a predetermined phase difference of 180 degrees between them. Thus, the second clock signal is an inverted first clock signal.

Referring to FIG. 1B with continued reference to FIG. 1A, the fifth, sixth, and ninth latches 104e, 104f, and 104i operate at the same phase of the first clock signal. Thus, the fifth and sixth latches 104e and 104f are opaque when the ninth latch 104i is opaque. The ninth latch 104i holds the delayed first feedback signal at a constant logic state, irrespective of the change in logic state of the first feedback signal due to the first clock signal. The purpose of the fifth and sixth latches 104e and 104f for holding the delayed first and second compensated signals is defeated. Similarly, there is redundancy amongst the seventh, eighth, and tenth latches 104g, 104h, and 104j. Therefore, the fifth through eighth latches are eliminated without altering the function of the DFE 100.

However, for the DFE 100 to function accurately, it is important that the first and second clock signals have a 50 percent duty cycle. If the first and second clock signals fail to have a 50 percent duty cycle, the first through fourth latches 104a-104d may have hold issues leading to functional failure. Further, the first through fourth latches 104a-104d are sense amplifier-type latches that are edge triggered. When either of the first or second clock signals transition from a high to a low logic state, the first through fourth latches 104a-104d lose the data bits captured in the analog input signal. The loss of the data bits is undesirable.

Therefore, it would be advantageous to have a DFE that operates at clock signals with multiple duty cycles, does not lose data bits at the transition of logic states of the clock signals, achieves the fundamental timing limit, and overcomes the above-mentioned limitations of conventional DFEs.

SUMMARY

In an embodiment of the present invention, a decision feedback equalizer (DFE) includes first and second summer circuits, first through sixth flip-flops, first and second multiplexers, and first and second feedback generators. The first and second summer circuits receive an analog input signal, and first and second weighted feedback signals and generate first and second intermediate signals, respectively. The first and second weighted feedback signals have a first predetermined phase difference therebetween. The first flip-flop has a first input terminal connected to the first summer circuit for receiving the first intermediate signal, a clock input terminal for receiving a first clock signal, a second input terminal for receiving a first offset voltage value, and an output terminal for generating a first compensated signal. The second flip-flop having a first input terminal connected to the first summer circuit for receiving the first intermediate signal, a clock input terminal for receiving the first clock signal, a second input terminal for receiving an inverted first offset voltage value, and an output terminal for generating a second compensated signal. The third flip-flop has a first input terminal connected to the second summer circuit for receiving the second intermediate signal, a clock input terminal for receiving a second clock signal, a second input terminal for receiving the first offset voltage value, and an output terminal for generating a third compensated signal. The fourth flip-flop having a first input terminal connected to the second summer circuit for receiving the second intermediate signal, a clock input terminal for receiving the second clock signal, a second input terminal for receiving the inverted first offset voltage value, and an output terminal for generating a fourth compensated signal. The first and second clock signals have the first predetermined phase difference therebetween. The first multiplexer has first and second input terminals connected to the output terminals of the first and second flip-flops for receiving the first and second compensated signals, respectively, a select terminal for receiving a first select signal, and an output terminal for outputting at least one of the first and second compensated signals as a first feedback signal. A first feedback generator is connected to the output terminal of the first multiplexer for receiving the first feedback signal and generating the first weighted feedback signal. The first feedback generator is connected to the first summer circuit for providing the first weighted feedback signal thereto. The second multiplexer has first and second input terminals connected to the output terminals of the third and fourth flip-flops for receiving the third and fourth compensated signals, a select terminal for receiving a second select signal, and an output terminal for outputting at least one of the third and fourth compensated signals as a second feedback signal. The second feedback generator is connected to the output terminal of the second multiplexer for receiving the second feedback signal and generating the second weighted feedback signal. The second feedback generator is connected to the second summer circuit for providing the second weighted feedback signal thereto. The fifth flip-flop has a first input terminal connected to the output terminal of the first multiplexer for receiving the first feedback signal, a clock input terminal for receiving a third clock signal, and an output terminal for outputting a third feedback signal. The select terminal of the second multiplexer is connected to the output terminal of the fifth flip-flop for receiving the third feedback signal as the second select signal. The sixth flip-flop has a first input terminal connected to the output terminal of the second multiplexer for receiving the second feedback signal, a clock input terminal for receiving a fourth clock signal, and an output terminal for outputting a fourth feedback signal. The select terminal of the first multiplexer is connected to the output terminal of the sixth flip-flop for receiving the fourth feedback signal as the first select signal. The third and fourth clock signals have the first predetermined phase difference therebetween. The first and third clock signals, and the second and fourth clock signals have a second predetermined phase difference therebetween.

The second and third clock signals, and the first and fourth clock signals have a third predetermined phase difference therebetween. Thus, the first and second weighted feedback signals compensate an error in the analog input signal.

In another embodiment of the present invention, a DFE includes a set of summer circuits, first through sixth flip-flops, first and second multiplexers, first through fourth latches, and first through eighth feedback generators. The set of summer circuits includes first and second summer circuits for receiving an analog input signal, and first, second, third, fourth, fifth, sixth, seventh, and eighth weighted feedback signals and generating first and second intermediate signals. The first summer circuit receives the first, fourth, fifth, and eighth weighted feedback signals and generates the first intermediate signal. The second summer circuit receives the second, third, sixth, and seventh weighted feedback signals and generate the second intermediate signal. The first flip-flop has a first input terminal connected to the first summer circuit for receiving the first intermediate signal, a clock input terminal for receiving a first clock signal, a second input terminal for receiving a first offset voltage value, and an output terminal for generating a first compensated signal. The second flip-flop has a first input terminal connected to the first summer circuit for receiving the first intermediate signal, a clock input terminal for receiving the first clock signal, a second input terminal for receiving an inverted first offset voltage value, and an output terminal for generating a second compensated signal. The third flip-flop has a first input terminal connected to the second summer circuit for receiving the second intermediate signal, a clock input terminal for receiving a second clock signal, a second input terminal for receiving the first offset voltage value, and an output terminal for generating a third compensated signal. The fourth flip-flop has a first input terminal connected to the second summer circuit for receiving the second intermediate signal, a clock input terminal for receiving the second clock signal, a second input terminal for receiving the inverted first offset voltage value, and an output terminal for generating a fourth compensated signal. The first and second clock signals have a first predetermined phase difference therebetween. The first multiplexer has first and second input terminals connected to the output terminals of the first and second flip-flops for receiving the first and second compensated signals, respectively, a select terminal for receiving a first select signal, and an output terminal for outputting at least one of the first and second compensated signals as a first feedback signal. The first feedback generator is connected to the output terminal of the first multiplexer for receiving the first feedback signal and generating the first weighted feedback signal. The first feedback generator is connected to the first summer circuit for providing the first weighted feedback signal thereto. The second multiplexer has first and second input terminals connected to the output terminals of the third and fourth flip-flops for receiving the third and fourth compensated signals, a select terminal for receiving a second select signal, and an output terminal for outputting at least one of the third and fourth compensated signals as a second feedback signal. The second feedback generator is connected to the output terminal of the second multiplexer for receiving the second feedback signal and generating the second weighted feedback signal. The second feedback generator is connected to the second summer circuit for providing the second weighted feedback signal thereto. The fifth flip-flop has a first input terminal connected to the output terminal of the first multiplexer for receiving the first feedback signal, a clock input terminal for receiving a third clock signal, and an output terminal for outputting a third feedback signal. The select terminal of the second multiplexer is connected to the output terminal of the fifth flip-flop for receiving the third feedback signal as the second select signal. The third feedback generator is connected to the output terminal of the fifth flip-flop for receiving the third feedback signal and generating the third weighted feedback signal. The third feedback generator is connected to the first summer circuit for providing the third weighted feedback signal thereto. The sixth flip-flop having a first input terminal connected to the output terminal of the second multiplexer for receiving the second feedback signal, a clock input terminal for receiving a fourth clock signal, and an output terminal for outputting a fourth feedback signal. The select terminal of the first multiplexer is connected to the output terminal of the sixth flip-flop for receiving the fourth feedback signal as the first select signal. The fourth feedback generator is connected to the output terminal of the sixth flip-flop for receiving the fourth feedback signal and generating the fourth weighted feedback signal. The fourth feedback generator is connected to the first summer circuit for providing the fourth weighted feedback signal thereto. The first latch has an input terminal connected to the output terminal of the fifth flip-flop for receiving the third feedback signal, a clock input terminal for receiving the third clock signal, and an output terminal for outputting a fifth feedback signal. The fifth feedback generator is connected to the output terminal of the first latch for receiving the fifth feedback signal and generating the fifth weighted feedback signal. The fifth feedback generator is connected to the first summer circuit for providing the fifth weighted feedback signal thereto. The second latch has an input terminal connected to the output terminal of the first latch for receiving the fifth feedback signal, a clock input terminal for receiving the third clock signal, and an output terminal for outputting a sixth feedback signal. The sixth feedback generator is connected to the output terminal of the second latch for receiving the sixth feedback signal and generating the sixth weighted feedback signal. The sixth feedback generator is connected to the second summer circuit for providing the sixth weighted feedback signal thereto. The third latch has an input terminal connected to the output terminal of the sixth flip-flop for receiving the fourth feedback signal, a clock input terminal for receiving the fourth clock signal, and an output terminal for outputting a seventh feedback signal. The seventh feedback generator is connected to the output terminal of the third latch for receiving the seventh feedback signal and generating the seventh weighted feedback signal. The seventh feedback generator is connected to the second summer circuit for providing the seventh weighted feedback signal thereto. The fourth latch has an input terminal connected to the output terminal of the third latch for receiving the seventh feedback signal, a clock input terminal for receiving the fourth clock signal, and an output terminal for outputting an eighth feedback signal. The eighth feedback generator is connected to the output terminal of the fourth latch for receiving the eighth feedback signal and generating the eighth weighted feedback signal. The eighth feedback generator is connected to the second summer circuit for providing the eighth weighted feedback signal thereto. The third and fourth clock signals have the first predetermined phase difference therebetween. The first and third clock signals, the second and fourth clock signals, and the second and third clock signals have a second predetermined phase difference therebetween. Thus, the first, second, third, fourth, fifth, sixth, seventh, and eighth weighted feedback signals compensate an error in the analog input signal.

Various embodiments of the present invention include a DFE for compensating an error in an analog input signal. The DFE includes first and second summer circuits, first through sixth flip-flops, first and second multiplexers, and first and second feedback generators. The first and second summer circuits receive the analog input signal and first and second weighted feedback signals, and generate first and second intermediate signals, respectively. The first flip-flop receives the first intermediate signal, a first offset voltage value and a first clock signal, and generates a first compensated signal. The second flip-flop receives the first intermediate signal, the first clock signal and an inverted first offset voltage value, and generates a second compensated signal. The third flip-flop receives the second intermediate signal, a second clock signal and the first offset voltage value, and generates a third compensated signal. The fourth flip-flop receives the second intermediate signal, the second clock signal and the inverted first offset voltage value, and generates a fourth compensated signal. The first and second clock signals have a first predetermined phase difference between them. The first multiplexer outputs at least one of the first and second compensated signals as a first feedback signal, based on a first select signal. The first feedback generator receives the first feedback signal, generates the first weighted feedback signal and provides the first weighted feedback signal to the first summer circuit. The second multiplexer outputs at least one of the third and fourth compensated signals as a second feedback signal, based on a second select signal. The second feedback generator receives the second feedback signal, generates the second weighted feedback signal and provides the second weighted feedback signal to the second summer circuit. The fifth flip-flop receives the first feedback signal and a third clock signal, and outputs a third feedback signal. The second multiplexer receives the third feedback signal as the second select signal. The sixth flip-flop receives the second feedback signal and a fourth clock signal, and outputs a fourth feedback signal. The first multiplexer receives the fourth feedback signal as the first select signal. The third and fourth clock signals have the first predetermined phase difference between them. The first and third clock signals, and the second and fourth clock signals have a second predetermined phase difference between them. The second and third clock signals, and the first and fourth clock signals have a third predetermined phase difference between them. Thus, the first and second weighted feedback signals compensate the error in the analog input signal. As compared to the conventional DFE, the loop unrolling technique does not create timing paths of one UI. Thus, the DFE achieves the fundamental timing limit. Further, as the clock signals with multiple predetermined phase differences are used, oscillators that do not guarantee 50 percent duty cycles can be used. Each of the first through fourth flip-flops includes a sense amplifier-type latch and a dynamic latch. Thus, the first through fourth flip-flops do not lose data bits at the transition of logic levels of the clock signals.

BRIEF DESCRIPTION OF DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF EMBODIMENTS

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

Figure 1A:
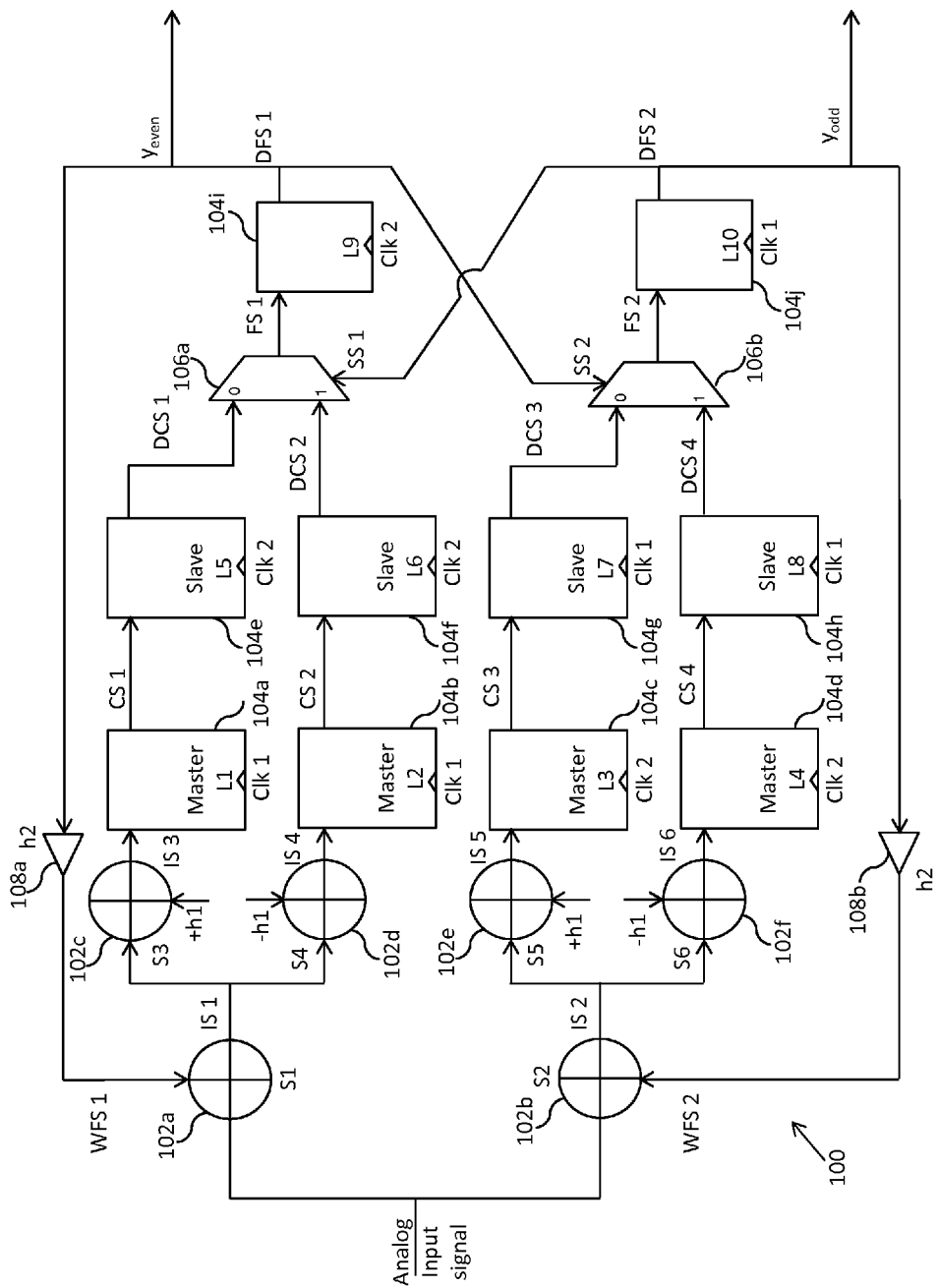
FIG. 1A is a block diagram of a conventional decision feedback equalizer (DFE)
Figure 1B:
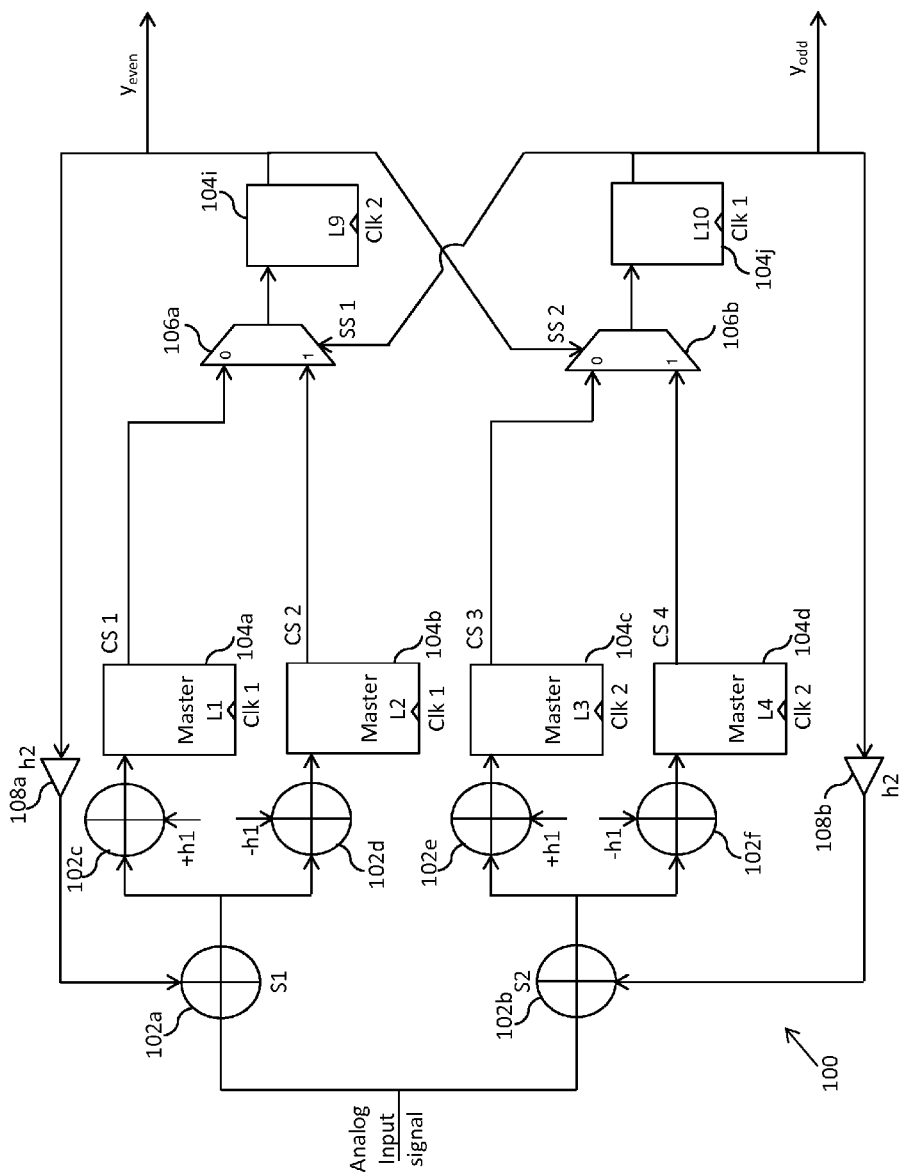
FIG. 1B is a block diagram of another conventional DFE.
Figure 2:
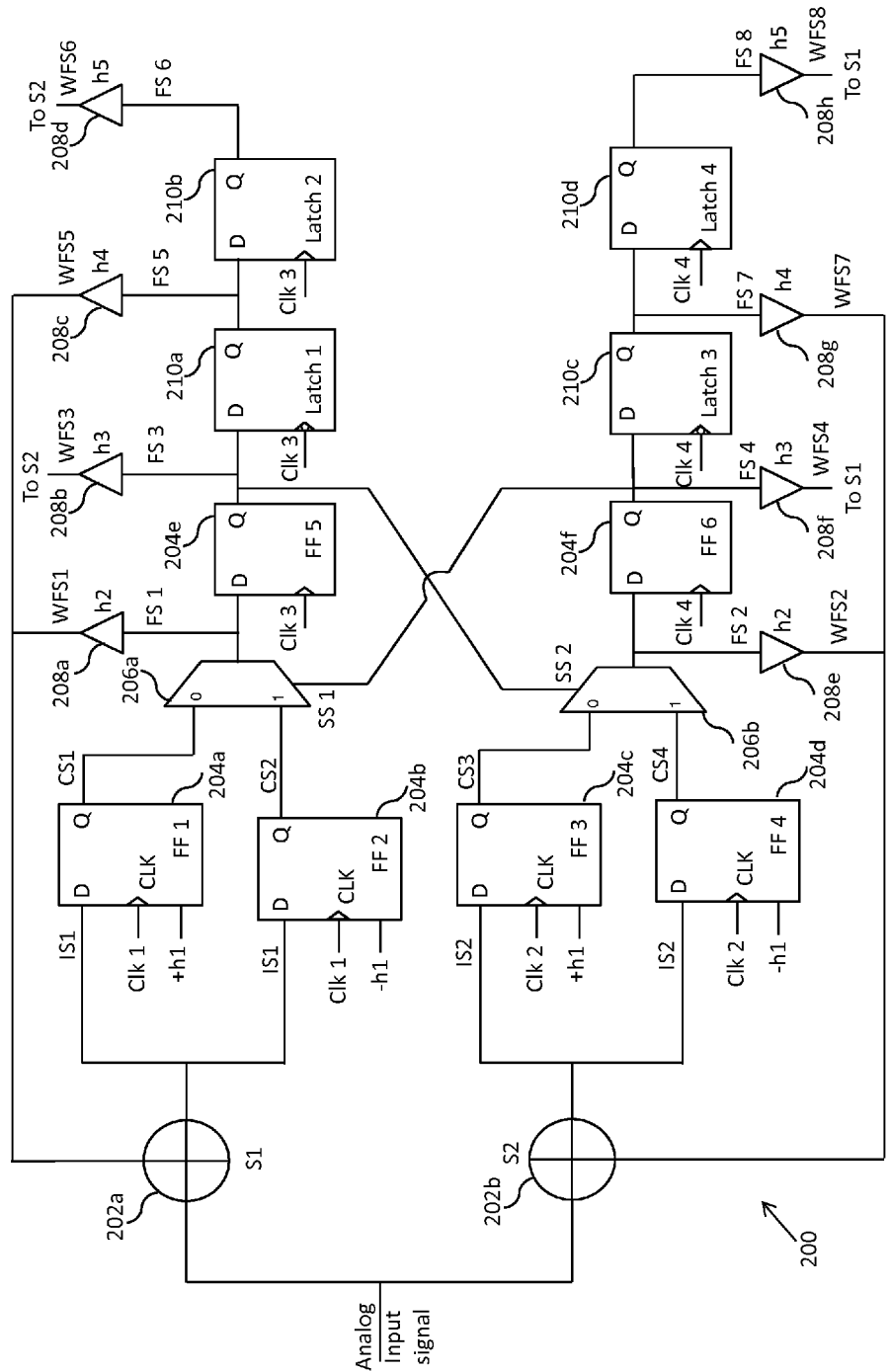
FIG. 2 is a block diagram of a DFE in accordance with an embodiment of the present invention.

Referring now to FIG. 2, a decision feedback equalizer (DFE) 200 is shown in accordance with an embodiment of the present invention. The DFE 200 includes first and second summer circuits 202a-202b, first through sixth flip-flops 204a-204f, first and second multiplexers 206a and 206b, first through eighth feedback generators 208a-208h, and first through fourth latches 210a-210d. The first through fourth flip-flops 204a-204d include a sense amplifier-type latch and a dynamic latch.

The fifth and sixth flip-flops 204e and 204f are true-single-phase-clock (TSPC) flip-flops that are edge triggered flip-flops. The first and third latches 210a and 210c are negative-level triggered TSPC latches. The second and fourth latches 210b and 210d are positive-level triggered TSPC latches. The structure and function of the TSPC flip-flops is well known to a person skilled in the art.

The first and second summer circuits 202a and 202b receive an analog input signal. The first summer circuit 202a receives first, fourth, fifth and eighth weighted feedback signals, and generates a first intermediate signal. The second summer circuit 202b receives second, third, sixth, and seventh weighted feedback signals, and generates a second intermediate signal.

The first flip-flop 204a has a first input terminal connected to the first summer circuit 202a for receiving the first intermediate signal, a second input terminal for receiving a first offset voltage value, a clock input terminal for receiving a first clock signal, and an output terminal for outputting a first compensated signal. The second flip-flop 204b has a first input terminal connected to the first summer circuit 202a for receiving the first intermediate signal, a second input terminal for receiving a second offset voltage value, a clock input terminal for receiving the first clock signal, and an output terminal for outputting a second compensated signal.

The first multiplexer 206a has first and second input terminals connected to the output terminals of the first and second flip-flops 204a and 204b for receiving the first and second compensated signals, respectively, a select terminal for receiving a first select signal, and an output terminal for outputting a first feedback signal. The first feedback generator 208a has an input terminal connected to the output terminal of the first multiplexer 206a for receiving the first feedback signal, multiplying the first feedback signal with a third offset voltage value, and an output terminal for outputting a first weighted feedback signal. The fifth flip-flop 204e has an input terminal connected to the output terminal of the first multiplexer 206a for receiving the first feedback signal, a clock input terminal for receiving a third clock signal, and an output terminal for outputting a third feedback signal. The second feedback generator 208b has an input terminal connected to the output terminal of the fifth flip-flop 204e for receiving the third feedback signal, multiplying the third feedback signal with a fourth offset voltage value, and an output terminal for generating the third weighted feedback signal.

The first latch 210a has an input terminal connected to the output terminal of the fifth flip-flop 204e for receiving the third feedback signal, a clock input terminal for receiving the third clock signal, and an output terminal for outputting a fifth feedback signal. The third feedback generator 208c has an input terminal connected to the output terminal of the first latch 210a for receiving the fifth feedback signal, multiplying the fifth feedback signal with a fifth offset voltage value, and an output terminal for outputting the fifth weighted feedback signal. The second latch 210b has an input terminal connected to the output terminal of the first latch 210a for receiving the fifth feedback signal, a clock input terminal for receiving the third clock signal, and an output terminal for outputting the sixth feedback signal. A fourth feedback generator 208d has an input terminal connected to the output terminal of the second latch 210b for receiving the sixth feedback signal, multiplying the sixth feedback signal with a sixth offset voltage value, and an output terminal for outputting the sixth weighted feedback signal. The second offset voltage value is an inverted first offset voltage value.

The third flip-flop 204c has a first input terminal connected to the second summer circuit 202b for receiving the second intermediate signal, a second input terminal for receiving the first offset voltage value, a clock input terminal for receiving a second clock signal, and an output terminal for outputting a third compensated signal. The fourth flip-flop 204d has a first input terminal connected to the second summer circuit 202b for receiving the second intermediate signal, a second input terminal for receiving the second offset voltage value, a clock input terminal for receiving the second clock signal, and an output terminal for outputting a fourth compensated signal.

The second multiplexer 206b has first and second input terminals connected to the output terminals of the third and fourth flip-flops 204c and 204d for receiving the third and fourth compensated signals, respectively, a select terminal for receiving a second select signal, and an output terminal for outputting a second feedback signal. The fifth feedback generator 208e has an input terminal connected to the output terminal of the second multiplexer 206b for receiving the second feedback signal, multiplying the second feedback signal with the third offset voltage value, and an output terminal for outputting a second weighted feedback signal. The sixth flip-flop 204f has an input terminal connected to the output terminal of the second multiplexer 206b for receiving the second feedback signal, a clock input terminal for receiving a fourth clock signal, and an output terminal for outputting a fourth feedback signal. The sixth feedback generator 208f has an input terminal connected to the output terminal of the sixth flip-flop 204f for receiving the fourth feedback signal, multiplying the fourth feedback signal with the fourth offset voltage value, and an output terminal for generating the fourth weighted feedback signal.

The third latch 210c has an input terminal connected to the output terminal of the sixth flip-flop 204f for receiving the fourth feedback signal, a clock input terminal for receiving the fourth clock signal, and an output terminal for outputting a seventh feedback signal. The seventh feedback generator 208g has an input terminal connected to the output terminal of the third latch 210c for receiving the seventh feedback signal, multiplying the seventh feedback signal with the fifth offset voltage value, and an output terminal for outputting the seventh weighted feedback signal. The fourth latch 210d has an input terminal connected to the output terminal of the third latch 210c for receiving the seventh feedback signal, a clock input terminal for receiving the fourth clock signal, and an output terminal for outputting the eighth feedback signal. The eighth feedback generator 208h has an input terminal connected to the output terminal of the fourth latch 210d for receiving the eighth feedback signal, multiplying the eighth feedback signal with the sixth offset voltage value, and an output terminal for outputting the eighth weighted feedback signal.

The output terminals of the first, third, sixth, and eighth feedback generators 208a, 208c, 208f, and 208h are connected to the first summer circuit 202a for providing the first, third, sixth, and eighth weighted feedback signals thereto. The output terminals of the second, fourth, fifth, and seventh feedback generators 208b, 208d, 208e, and 208g are connected to the second summer circuit 202b for providing the second, fourth, fifth, and seventh weighted feedback signals thereto.

Figure 3:
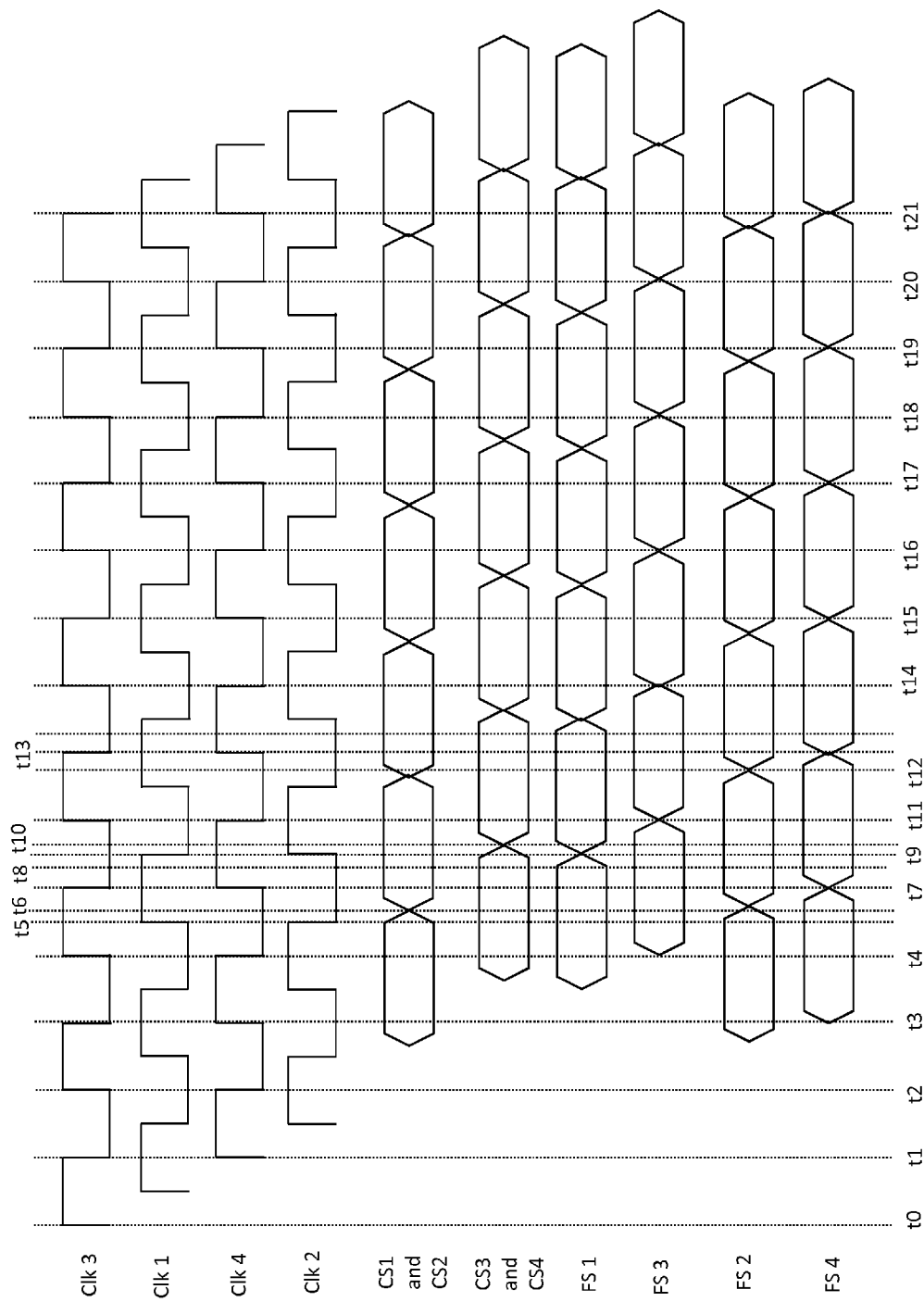
FIG. 3 is a timing diagram illustrating various signals of the DFE of FIG. 2 in accordance with an embodiment of the present invention.

Referring now to FIG. 3, a timing diagram that illustrates the first through fourth clock signals, the first through fourth compensated signals, and the first through fourth feedback signals of the DFE 200 is shown in accordance with an embodiment of the present invention. In an example, as illustrated in FIG. 3, the first and second clock signals, and the third and fourth clock signals have a phase difference of 180 degrees between them, respectively. The first and third clock signals, and the second and fourth clock signals have a phase difference of 270 degrees between them. The second and third clock signals, and the first and fourth clock signals have a phase difference of 90 degrees between them. In an embodiment of the present invention, one UI corresponds to a phase difference of 90 degrees.

The first through fourth clock signals are half-rate clock signals. Hence, the first and second flip-flops 204a and 204b sample the first intermediate signal at the rising edges of the first clock signal and generate even data bits, and the third and fourth flip-flops 204c and 204d sample the second intermediate signal at the rising edges of the second clock signal and generate odd data bits.

It is well known in the art that each of the first through sixth flip-flops 204a-204f, first through fourth latches 210a-210d, and the first and second multiplexers 206a and 206b has a corresponding clock-to-output delay. The clock-to-output delays, propagation delays and set-up times govern the fundamental timing limit of the DFE 200.

In operation, the first flip-flop 204a receives the first intermediate signal at the rising edge of the first clock signal at time instance t5 and generates the first compensated signal at time instance t6. The first flip-flop 204a compensates the error in the first intermediate signal by adding the predetermined first offset voltage value thereto. Similarly, the second flip-flop 204b receives the first intermediate signal at the rising edge of the first clock signal at time instance t5 and generates the second compensated signal at time instance t6. The second flip-flop 204b compensates the error in the first intermediate signal by adding the predetermined second offset voltage value thereto.

The first multiplexer 206a receives the fourth feedback signal as the first select signal at time instance t7 and generates the first feedback signal, based on the first and second compensated signals at time instance t9. The fifth flip-flop 204e receives the first feedback signal at the rising edge of the third clock signal and generates the third feedback signal at time instance t11. Thus, the first feedback signal stabilizes in the time period between time instances t9 and t11. Time period T1 between the reception of the first intermediate signal at the first flip-flop 204a at time instance t5 and the generation of the third feedback signal at the fifth flip-flop 204e at time instance t11 is 1.5 UI, since the phase difference between the first and third clock signals is 270 degrees. The time period T1 includes the clock-to-output delay of the first flip-flop 204a, the propagation time of the first compensated signal to the first multiplexer 206a, and the setup time of the fifth flip-flop 204e.

Similarly, time period T2 between the reception of the first intermediate signal at the second flip-flop 204b at time instance t5 and generation of the third feedback signal at the fifth flip-flop 204e at time instance t11 is 1.5 UI. The time period T2 includes the clock-to-output delay of the second flip-flop 204b, the propagation time of the second compensated signal to the first multiplexer 206a and the setup time of the fifth flip-flop 204e. Time period T3 between the reception of the second feedback signal at the sixth flip-flop 204f at time instance t7 and the generation of the third feedback signal at the fifth flip-flop 204e at time instance t11 is 1 UI as the phase difference between the third and fourth clock signals is 90 degrees. The time period T3 includes the clock-to-output delay of the sixth flip-flop 204f, the setup time of the first multiplexer 206a and the setup time of the fifth flip-flop 204e.

The third flip-flop 204c receives the second intermediate signal at the rising edge of the second clock signal at time instance t9 and generates the third compensated signal at time instance t10. The third flip-flop 204c compensates the error in the second intermediate signal by adding the predetermined first offset voltage value thereto. Similarly, the fourth flip-flop 204d receives the second intermediate signal at the rising edge of the second clock signal at time instance t9 and generates the fourth compensated signal at time instance t10. The fourth flip-flop 204d compensates the error in the second intermediate signal by adding the predetermined second offset voltage value thereto.

The second multiplexer 206b receives the third feedback signal as the second select signal at time instance t11 and generates the second feedback signal, based on the third and fourth compensated signals at the time instance t12. The sixth flip-flop 204f receives the second feedback signal at the rising edge of the fourth clock signal and generates the fourth feedback signal at time instance t13. Thus, the second feedback signal stabilizes in the time period between time instances t12 and t13. Time period T4 between the reception of the second intermediate signal at the third flip-flop 204c at time instance t9 and generation of the fourth feedback signal at the sixth flip-flop 204e at time instance t13 is 1.5 UI as the phase difference between the second and fourth clock signals is 270 degrees. The time period T4 includes the clock-to-output delay of the third flip-flop 204c, the propagation time of the third compensated signal to the second multiplexer 206b and the setup time of the sixth flip-flop 204f.

Similarly, time period T5 between reception of the second intermediate signal at the fourth flip-flop 204d at time instance t9 and generation of the fourth feedback signal at the sixth flip-flop 204f at time instance t13 is 1.5 UI. The time period T5 includes the clock-to-output delay of the fourth flip-flop 204d, the propagation time of the fourth compensated signals to the second multiplexer 206b and the setup time of the sixth flip-flop 204f. Time period T6 between reception of the first feedback signal at the fifth flip-flop 204e at time instance t11 and generation of the fourth feedback signal at the sixth flip-flop 204f at time instance t13 is 1 UI, since the phase difference between the third and fourth clock signals is 90 degrees. The time period T6 includes the clock-to-output delay of the fifth flip-flop 204e, the setup time of the second multiplexer 206b and the setup time of the sixth flip-flop 204f.

The first through fourth latches 210a-210d hold the logic states of the third and fourth feedback signals. The first latch 210a receives the third feedback signal at the rising edge of the third clock signal and outputs the fifth feedback signal. The first latch 210a is opaque at the falling edge of the third clock signal and does not output the fifth feedback signal. However, the second latch 210b outputs the sixth feedback signal at the falling edge of the third clock signal. Thus, a data bit received in the analog input signal is shifted from the first latch 210a to the second latch 210b every UI.

Similarly, the third latch 210c receives the fourth feedback signal at the rising edge of the fourth clock signal and outputs the seventh feedback signal. The third latch 210c is opaque at the falling edge of the fourth clock signal and does not output the seventh feedback signal. However, the fourth latch 210d outputs the eighth feedback signal at the falling edge of the fourth clock signal. Thus, a data bit received in the analog input signal is shifted from the third latch 210c to the fourth latch 210d every UI. It will be well understood by a person skilled in the art that the number of latches is not restricted to four. The DFE 200 may have more than four latches, based on the error in the analog input signal.

Figure 4:
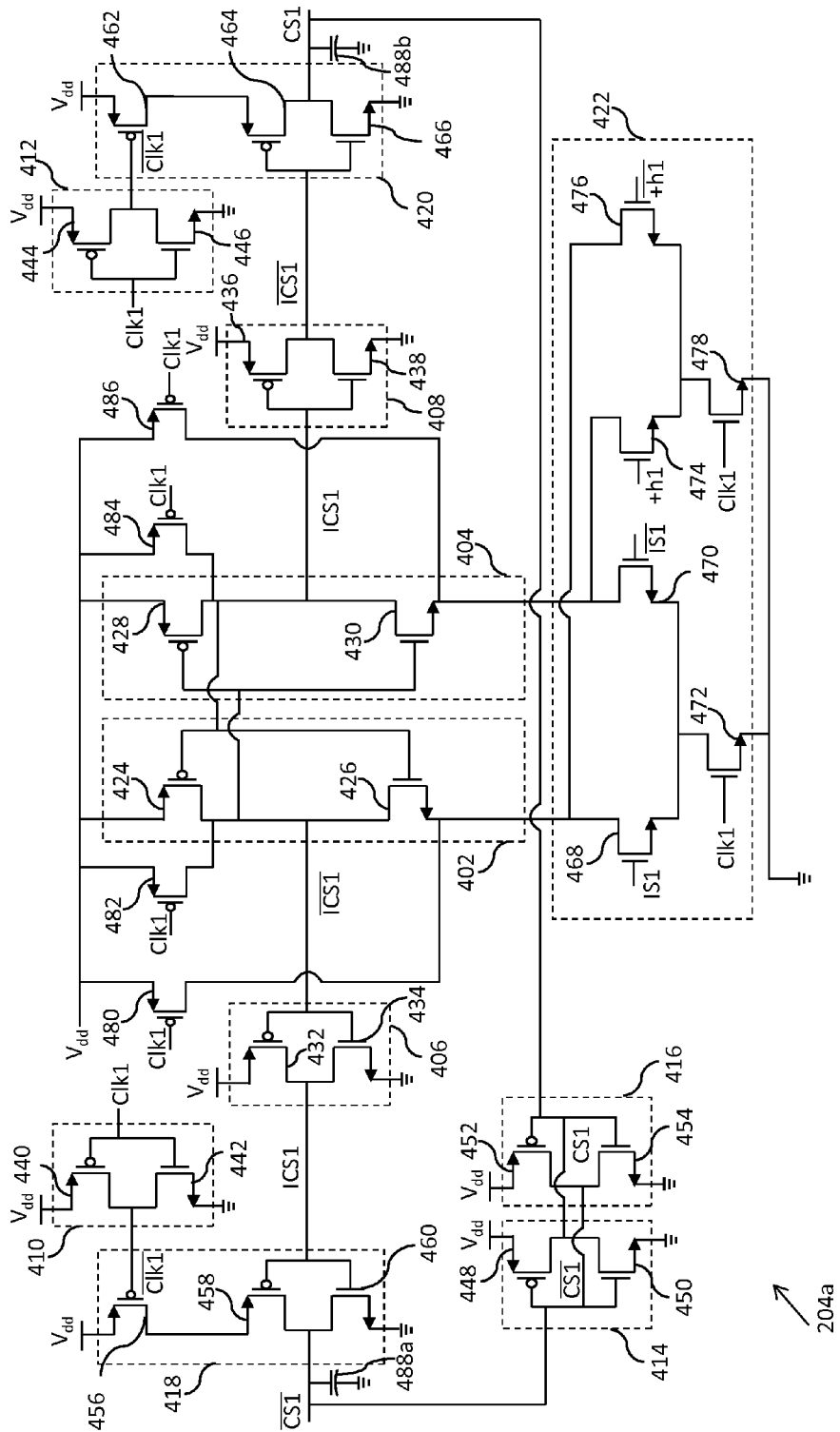
FIG. 4 is a circuit diagram of a flip-flop of the DFE of FIG. 2 in accordance with an embodiment of the present invention.

Referring now to FIG. 4, a circuit diagram of the first flip-flop 204a is shown, in accordance with an embodiment of the present invention. The second, third and fourth flip-flops 204b, 204c and 204d are structurally and functionally similar to the first flip-flop 204a. The first flip-flop 204a includes first through eighth inverters 402-416, first and second dynamic latches 418 and 420, a differential amplifier stage 422, and first and second capacitors 488a-488b. The first flip-flop 204a also includes ninth and tenth inverters (not shown) that receive the first intermediate signal and the first offset voltage value, and generate an inverted first intermediate signal and an inverted first offset voltage value, respectively.

The first inverter 402 includes first and second transistors 424 and 426. The second inverter 404 includes third and fourth transistors 428 and 430. The third inverter 406 includes fifth and sixth transistors 432 and 434. The fourth inverter 408 includes seventh and eighth transistors 436 and 438. The fifth inverter 410 includes ninth and tenth transistors 440 and 442. The sixth inverter 412 includes eleventh and twelfth transistors 444 and 446. The seventh inverter 414 includes thirteenth and fourteenth transistors 448 and 450. The eighth inverter 416 includes fifteenth and sixteenth transistors 452 and 454.

The first dynamic latch 418 includes seventeenth, eighteenth and nineteenth transistors 456, 458 and 460. The second dynamic latch 420 includes twentieth, twenty-first, and twenty-second transistors 462, 464 and 466. The differential amplifier stage 422 includes twenty-third through twenty-eighth transistors 468-478. The first flip-flop 204a also includes twenty-ninth through thirty-second transistors 480-486.

The first and second inverters 402 and 404 are cross couple-connected to each other. The first transistor 424 has a source terminal connected to a supply voltage $V_{dd}$, a drain terminal connected to a drain terminal of the second transistor 426 and a gate terminal connected to a gate terminal of the second transistor 426. The third transistor 428 has a source terminal connected to the supply voltage $V_{dd}$, a drain terminal connected to a drain terminal of the fourth transistor 430 and a gate terminal connected to a gate terminal of the fourth transistor 430. The drain terminals of the first and second transistors 424 and 426 are connected to the gate terminals of the third and fourth transistors 428 and 430. The drain terminals of the third and fourth transistors 428 and 430 are connected to the gate terminals of the first and second transistors 424 and 426. The first inverter 402 generates an inverted intermediate first compensated signal and the second inverter 404 generates an intermediate first compensated signal.

The differential amplifier stage 422 includes first and second differential transistor pairs that include the twenty-third and twenty-fourth transistors 468 and 470, and twenty-sixth and twenty-seventh transistors 474 and 476, respectively. The twenty-third transistor 468 has a drain terminal connected to a source terminal of the second transistor 426, a source terminal connected to a source terminal of the twenty-fourth transistor 470 and a gate terminal connected to the first summer circuit 202a for receiving the first intermediate signal. The twenty-fourth transistor 470 has a drain terminal connected to a source terminal of the fourth transistor 430 and a gate terminal connected to the ninth inverter for receiving the inverted first intermediate signal. The twenty-fifth transistor 472 has a drain terminal connected to the source terminals of the twenty-third and twenty-fourth transistors 468 and 470, a source terminal connected to ground and a gate terminal for receiving the first clock signal. The first through fourth transistors 424-430 and the twenty-third and twenty-fourth transistors 468 and 470 function as a sense amplifier-type latch circuit that captures and stores the data bits in the analog input signal.

The twenty-sixth transistor 474 has a drain terminal connected to the source terminal of the fourth transistor 430, a source terminal connected to a source terminal of the twenty-seventh transistor 476 and a gate terminal connected to a voltage generator (not shown) for receiving the first offset voltage value. The twenty-seventh transistor 476 has a drain terminal connected to the source terminal of the second transistor 426 and a gate terminal connected to the tenth inverter for receiving the inverted first offset voltage value. The twenty-eighth transistor 478 has a drain terminal connected to the source terminals of the twenty-sixth and twenty-seventh transistors 474 and 476, a source terminal connected to ground and a gate terminal for receiving the first clock signal.

The twenty-ninth transistor 480 has a source terminal connected to the supply voltage $V_{dd}$, a drain terminal connected to the drain terminal of the second transistor 426 and a gate terminal for receiving the first clock signal. The thirtieth transistor 482 has a source terminal connected to the supply voltage $V_{dd}$, a drain terminal connected to the drain terminals of the first and second transistors 424 and 426, and a gate terminal for receiving the first clock signal.

The fifth transistor 432 has a source terminal connected to the supply voltage $V_{dd}$, a drain terminal connected to a drain terminal of the sixth transistor 434 and a gate terminal connected to a gate terminal of the sixth transistor 434. The sixth transistor 434 has a source terminal connected to ground. The gate terminals of the fifth and sixth transistors 432 and 434 are connected to the drain terminals of the first and second transistors 424 and 426 for receiving the inverted intermediate first compensated signal. The fifth and sixth transistors 432 and 434 generate an intermediate first compensated signal at the drain terminals thereof.

The ninth transistor 440 has a source terminal connected to the supply voltage $V_{dd}$, a drain terminal connected to a drain terminal of the tenth transistor 442 and a gate terminal connected to a gate terminal of the tenth transistor 442. The ninth and tenth transistors 440 and 442 receive the first clock signal at the gate terminals thereof, and generate an inverted first clock signal at the drain terminals thereof.

The seventeenth transistor 456 has a source terminal connected to the supply voltage $V_{dd}$, a drain terminal connected to a source terminal of the eighteenth transistor 458, and a gate terminal connected to the drain terminals of the ninth and tenth transistors 440 and 442 for receiving the inverted first clock signal. The eighteenth transistor 458 has a drain terminal connected to a drain terminal of the nineteenth transistor 460 and a gate terminal connected to a gate terminal of the nineteenth transistor 460. The drain terminals of the eighteenth and nineteenth transistors 458 and 460 are connected to ground by way of the first capacitor 488a. The gate terminals of the eighteenth and nineteenth transistors 458 and 460 are connected to the drain terminals of the fifth and sixth transistors 432 and 434 for receiving the intermediate first compensated signal. The eighteenth and nineteenth transistors 458 and 460 generate an inverted compensated signal at the drain terminals thereof.

The thirty-first transistor 484 has a source terminal connected to the supply voltage $V_{dd}$, a drain terminal connected to the drain terminals of the third and fourth transistors 428 and 430 and a gate terminal for receiving the first clock signal. The thirty-second transistor 486 has a source terminal connected to the supply voltage $V_{dd}$, a drain terminal connected to the drain terminal of the fourth transistor 430 and a gate terminal for receiving the first clock signal.

The seventh transistor 436 has a source terminal connected to the supply voltage $V_{dd}$, a drain terminal connected to a drain terminal of the eighth transistor 438 and a gate terminal connected to a gate terminal of the eighth transistor 438. The eighth transistor 438 has a source terminal connected to ground. The gate terminals of the seventh and eighth transistors 436 and 438 are connected to the drain terminals of the third and fourth transistors 428 and 430 for receiving the intermediate first compensated signal. The seventh and eighth transistors 436 and 438 generate the inverted intermediate first compensated signal at the drain terminals thereof. The eleventh transistor 444 has a source terminal connected to the supply voltage $V_{dd}$, a drain terminal connected to a drain terminal of the twelfth transistor 446 and a gate terminal connected to a gate terminal of the twelfth transistor 446. The gate terminals of the eleventh and twelfth transistors 444 and 446 receive the first clock signal. The eleventh and twelfth transistors 444 and 446 generate the inverted first clock signal at the drain terminals thereof.

The twentieth transistor 462 has a source terminal connected to the supply voltage $V_{dd}$, a drain terminal connected to a source terminal of the twenty-first transistor 464 and a gate terminal connected to the drain terminals of eleventh and twelfth transistors 444 and 446 for receiving the inverted first clock signal. The twenty-first transistor 464 has a drain terminal connected to a drain terminal of the twenty-second transistor 466 and a gate terminal connected to a gate terminal of the twenty-second transistor 466. The drain terminals of the twenty-first and twenty-second transistors 464 and 466 are connected to ground by way of the second capacitor 488b. The gate terminals of the twenty-first and twenty-second transistors 464 and 466 are connected to the drain terminals of the seventh and eighth transistors 436 and 438 for receiving the inverted intermediate first compensated signal. The twenty-first and twenty-second transistors 464 and 466 generate the first compensated signal at the drain terminals thereof.

The thirteenth transistor 448 has a source terminal connected to the supply voltage $V_{dd}$, a gate terminal connected to a gate terminal of the fourteenth transistor 450 and a drain terminal connected to a drain terminal of the fourteenth transistor 450. The fourteenth transistor 450 has a source terminal connected to ground. The fifteenth transistor 452 has a source terminal connected to the supply voltage $V_{dd}$, a gate terminal connected to a gate terminal of the sixteenth transistor 454 and a drain terminal connected to a drain terminal of the sixteenth transistor 454. The sixteenth transistor 454 has a source terminal connected to ground.

The gate terminals of the thirteenth and fourteenth transistors 448 and 450 are connected to the drain terminals of the eighteenth and nineteenth transistors 458 and 460 for receiving the inverted first compensated signal. The thirteenth and fourteenth transistors 448 and 450 generate the first compensated signal at the drain terminals thereof. The gate terminals of the fifteenth and sixteenth transistors 452 and 454 are connected to the drain terminals of the twenty-first and twenty-second transistors 464 and 466 for receiving the first compensated signal. The fifteenth and sixteenth transistors 452 and 454 generate the inverted first compensated signal at the drain terminals thereof.

The drain terminals of the fifteenth and sixteenth transistors 452 and 454 are connected to the gate terminals of the thirteenth and fourteenth transistors 448 and 450. The drain terminals of the thirteenth and fourteenth transistors 448 and 450 are connected to the gate terminals of the fifteenth and sixteenth transistors 452 and 454. Thus, the seventh and eighth inverters function as a weak cross-coupled inverter and store the logic states of the first and inverted first compensated signals.

In operation, when the first clock signal is at a logic low state, the twenty-fifth and twenty-eighth transistors 472 and 478 are switched off and the thirtieth and thirty-first transistors 482 and 484 are switched on. Thus, the first and second inverters 402 and 404 generate the inverted intermediate and intermediate first compensated signals, respectively, at a logic high state at the drain terminals thereof.

When the first clock signal transitions from the logic low to the logic high state, the twenty-fifth and twenty-eighth transistors 472 and 478 are switched on and the thirtieth and thirty-first transistors 482 and 484 are switched off. Thus, the first and second differential transistor pairs allow a flow of current between them. The difference in the voltage levels of the first intermediate signal and the inverted first intermediate signal at the gate terminals of the twenty-third and twenty-fourth transistors 468 and 470 determines the data bit latched by the sense amplifier-type latch circuit.

In an example, when the first clock signal transitions from the logic low to the high state, the second inverter 404 discharges faster than the first inverter 402. As a result, the second inverter 404 generates the intermediate first compensated signal at the logic low state. The fourth inverter 408 receives the logic low intermediate first compensated signal and generates the inverted intermediate first compensated signal at the logic high state. The sixth inverter 412 receives the logic high first clock signal and generates the inverted first clock signal at the logic low state. The twentieth transistor 462 receives the logic low inverted first clock signal and is switched on. The second dynamic latch 420 receives the logic high inverted intermediate first compensated signal and generates the first compensated signal at the logic low state. Similarly, the first dynamic latch 418 generates the inverted first compensated signal at the logic high state and charges the first capacitor 488a.

When the first clock signal transitions from the logic high to the logic low state, the sixth inverter 412 receives the logic low first clock signal and generates the inverted first clock signal at the logic high state. The twentieth transistor 462 receives the logic high inverted first clock signal and is switched off. Thus, the second dynamic latch 420 is opaque and continues to generate the first compensated signal at the logic low state. Similarly, the first dynamic latch 418 continues to generate the inverted first compensated signal at logic high state. Since the logic state of the inverted first and first compensated signals only transitions at the rising edge of the first clock signal, the first flip-flop 204a functions as a true flip-flop. Thus, the first through fourth flip-flops 204a-204d do not lose the data bits at the transition of the logic levels of the first and second clock signals.

Further, when a clock rate of the first clock signal is slow, the first and second capacitors 488a and 488b may discharge quickly. The discharge of the first and second capacitors 488a and 488b results in transition of the logic state of the inverted first and first compensated signals to the high impedance state, which is undesirable. However, the seventh and eighth inverters 414 and 416, which function as the weak cross-coupled inverter, hold the logic states of the inverted first and first compensated signals such that the DFE 200 functions accurately, even when the clock rate of the first clock signals is slow.

Moreover, the loop unrolling technique does not create timing paths of one UI in the DFE 200. As the time periods T1, T2, T5 and T6, as defined earlier, are 1.5 UI, the DFE 200 achieves the fundamental timing limit. Moreover, since the first, second, third and fourth clock signals have first, second, and third predetermined phase differences between them, clock signals that do not have 50 percent duty cycles can be used.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention. No element, act, or instruction used in the present application should be construed as critical or essential to the invention unless explicitly described as such. Further, the phrase "based on" is intended to mean "based, at least in part, on" unless explicitly stated otherwise.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A decision feedback equalizer (DFE), comprising:
   first and second summer circuits for receiving an analog input signal, and first and second weighted feedback signals and generating first and second intermediate signals, respectively, wherein the first and second weighted feedback signals have a first predetermined phase difference therebetween;
   a first flip-flop having a first input terminal connected to the first summer circuit for receiving the first intermediate signal, a clock input terminal for receiving a first clock signal, a second input terminal for receiving a first offset voltage value, and an output terminal for generating a first compensated signal;
   a second flip-flop having a first input terminal connected to the first summer circuit for receiving the first intermediate signal, a clock input terminal for receiving the first clock signal, a second input terminal for receiving an inverted first offset voltage value, and an output terminal for generating a second compensated signal;
   a third flip-flop having a first input terminal connected to the second summer circuit for receiving the second intermediate signal, a clock input terminal for receiving a second clock signal, a second input terminal for receiving the first offset voltage value, and an output terminal for generating a third compensated signal;
   a fourth flip-flop having a first input terminal connected to the second summer circuit for receiving the second intermediate signal, a clock input terminal for receiving the second clock signal, a second input terminal for receiving the inverted first offset voltage value, and an output terminal for generating a fourth compensated signal, wherein the first and second clock signals have the first predetermined phase difference therebetween;
   a first multiplexer having first and second input terminals for receiving the first and second compensated signals, respectively, a select terminal for receiving a first select signal, and an output terminal for outputting at least one of the first and second compensated signals as a first feedback signal;
   a first feedback generator connected to the output terminal of the first multiplexer for receiving the first feedback signal and generating the first weighted feedback signal, wherein the first feedback generator is connected to the first summer circuit for providing the first weighted feedback signal thereto;
   a second multiplexer having first and second input terminals for receiving the third and fourth compensated signals, a select terminal for receiving a second select signal, and an output terminal for outputting at least one of the third and fourth compensated signals as a second feedback signal;
   a second feedback generator connected to the output terminal of the second multiplexer for receiving the second feedback signal and generating the second weighted feedback signal, wherein the second feedback generator is connected to the second summer circuit for providing the second weighted feedback signal thereto;
   a fifth flip-flop having a first input terminal connected to the output terminal of the first multiplexer for receiving the first feedback signal, a clock input terminal for receiving a third clock signal, and an output terminal for outputting a third feedback signal, wherein the select terminal of the second multiplexer is connected to the output terminal of the fifth flip-flop for receiving the third feedback signal as the second select signal; and
   a sixth flip-flop having a first input terminal connected to the output terminal of the second multiplexer for receiving the second feedback signal, a clock input terminal for receiving a fourth clock signal, and an output terminal for outputting a fourth feedback signal, wherein the select terminal of the first multiplexer is connected to the output terminal of the sixth flip-flop for receiving the fourth feedback signal as the first select signal,
   wherein the third and fourth clock signals have the first predetermined phase difference therebetween,
   wherein the first and third clock signals, and the second and fourth clock signals have a second predetermined phase difference therebetween,
   wherein the second and third clock signals, and the first and fourth clock signals have a third predetermined phase difference therebetween, and
   whereby the first and second weighted feedback signals compensate an error in the analog input signal.

2. The DFE of claim 1, wherein the first flip-flop includes:
   a latch circuit including first and second inverters cross couple connected to each other, wherein the first inverter generates an inverted intermediate first compensated signal and the second inverter generates an intermediate first compensated signal;
   a first differential transistor pair, connected to the latch circuit, for receiving the first intermediate signal;
   a first transistor having a drain terminal connected to the first differential transistor pair, a source terminal connected to ground, and a gate terminal for receiving the first clock signal;
   a second differential transistor pair, connected to the latch circuit, for receiving the first offset voltage;
   a second transistor having a drain terminal connected to the second differential transistor pair, a source terminal connected to ground, and a gate terminal for receiving the first clock signal;
   a third inverter connected to the first inverter for receiving the inverted intermediate first compensated signal and generating the intermediate first compensated signal;
   a first dynamic latch circuit connected to the third inverter for receiving the intermediate first compensated signal, and an inverted first clock signal, and generating an inverted first compensated signal;

a fourth inverter connected to the second inverter for receiving the intermediate first compensated signal and generating the inverted intermediate first compensated signal;

a second dynamic latch circuit connected to the fourth inverter for receiving the inverted intermediate first compensated signal, and the inverted first clock signal, and generating the first compensated signal;

a fifth inverter connected to the first dynamic latch circuit for receiving the first compensated signal and generating the inverted first compensated signal; and a sixth inverter connected to the second dynamic latch for receiving the inverted first compensated signal and generating the first compensated signal, wherein the fifth and sixth inverters are cross couple connected to each other.

3. The DFE of claim 1, wherein the second flip-flop includes:

a latch circuit including first and second inverters cross couple connected to each other, wherein the first inverter generates an inverted intermediate second compensated signal and the second inverter generates an intermediate second compensated signal;

a first differential transistor pair, connected to the latch circuit, for receiving the first intermediate signal;

a first transistor having a drain terminal connected to the first differential transistor pair, a source terminal connected to ground, and a gate terminal for receiving the first clock signal;

a second differential transistor pair, connected to the latch circuit, for receiving the inverted first offset voltage value;

a second transistor having a drain terminal connected to the second differential transistor pair, a source terminal connected to ground, and a gate terminal for receiving the first clock signal;

a third inverter connected to the first inverter for receiving the inverted intermediate second compensated signal and generating the intermediate second compensated signal;

a first dynamic latch circuit connected to the third inverter for receiving the intermediate second compensated signal, and an inverted first clock signal, and generating an inverted second compensated signal;

a fourth inverter connected to the second inverter for receiving the intermediate second compensated signal and generating the inverted intermediate second compensated signal;

a second dynamic latch circuit connected to the fourth inverter for receiving the inverted intermediate second compensated signal, and the inverted first clock signal, and generating the second compensated signal;

a fifth inverter connected to the first dynamic latch circuit for receiving the second compensated signal and generating the inverted second compensated signal; and a sixth inverter connected to the second dynamic latch for receiving the inverted second compensated signal and generating the second compensated signal, wherein the fifth and sixth inverters are cross couple connected to each other.

4. The DFE of claim 1, wherein the third flip-flop includes:

a latch circuit including first and second inverters cross couple connected to each other, wherein the first inverter generates an inverted intermediate third compensated signal and the second inverter generates an intermediate third compensated signal;

a first differential transistor pair, connected to the latch circuit, for receiving the second intermediate signal;

a first transistor having a drain terminal connected to the first differential transistor pair, a source terminal connected to ground, and a gate terminal for receiving the first clock signal;

a second differential transistor pair, connected to the latch circuit, for receiving the first offset voltage;

a second transistor having a drain terminal connected to the second differential transistor pair, a source terminal connected to ground, and a gate terminal for receiving the first clock signal;

a third inverter connected to the first inverter for receiving the inverted intermediate third compensated signal and generating the intermediate third compensated signal;

a first dynamic latch circuit connected to the third inverter for receiving the intermediate third compensated signal, and an inverted second clock signal, and generating an inverted third compensated signal;

a fourth inverter connected to the second inverter for receiving the intermediate third compensated signal and generating the inverted intermediate third compensated signal;

a second dynamic latch circuit connected to the fourth inverter for receiving the inverted intermediate third compensated signal, and the inverted second clock signal, and generating the third compensated signal;

a fifth inverter connected to the first dynamic latch circuit for receiving the third compensated signal and generating the inverted third compensated signal; and a sixth inverter connected to the second dynamic latch for receiving the inverted third compensated signal and generating the third compensated signal, wherein the fifth and sixth inverters are cross couple connected to each other.

5. The DFE of claim 1, wherein the fourth flip-flop includes:

a latch circuit including first and second inverters cross couple connected to each other, wherein the first inverter generates an inverted intermediate fourth compensated signal and the second inverter generates an intermediate fourth compensated signal;

a first differential transistor pair, connected to the latch circuit, for receiving the second intermediate signal;

a first transistor having a drain terminal connected to the first differential transistor pair, a source terminal connected to ground, and a gate terminal for receiving the second clock signal;

a second differential transistor pair, connected to the latch circuit, for receiving the inverted first offset voltage value;

a second transistor having a drain terminal connected to the second differential transistor pair, a source terminal connected to ground, and a gate terminal for receiving the second clock signal;

a third inverter connected to the first inverter for receiving the inverted intermediate fourth compensated signal and generating the intermediate fourth compensated signal;

a first dynamic latch circuit connected to the third inverter for receiving the intermediate fourth compensated signal, and an inverted second clock signal, and generating an inverted fourth compensated signal;

a fourth inverter connected to the second inverter for receiving the intermediate fourth compensated signal and generating the inverted intermediate fourth compensated signal;

a second dynamic latch circuit connected to the fourth inverter for receiving the inverted intermediate fourth compensated signal, and the inverted second clock signal, and generating the fourth compensated signal;

a fifth inverter connected to the first dynamic latch circuit for receiving the fourth compensated signal and generating the inverted fourth compensated signal; and a sixth inverter connected to the second dynamic latch for receiving the inverted fourth compensated signal and generating the fourth compensated signal, wherein the fifth and sixth inverters are cross couple connected to each other.

6. The DFE of claim 1, wherein the fifth and sixth flip-flops, each comprise a true single phase clock flip-flop.

7. The DFE of claim 1, wherein the first predetermined phase difference is 180 degrees, the second predetermined phase difference is 270 degrees, and the third predetermined phase difference is 90 degrees.

8. The DFE of claim 1, wherein a third feedback generator is connected to the output terminal of the fifth flip-flop for receiving the third feedback signal and generating a third weighted feedback signal, and wherein the third feedback generator is connected to the second summer circuit for providing the third weighted feedback signal thereto.

9. The DFE of claim 8, wherein a fourth feedback generator is connected to the output terminal of the sixth flip-flop for receiving the fourth feedback signal and generating a fourth weighted feedback signal, and wherein the fourth feedback generator is connected to the first summer circuit for providing the fourth weighted feedback signal thereto, whereby the third and fourth weighted feedback signals compensate the error in the analog input signal.

10. The DFE of claim 9, further comprising:
a first latch having an input terminal connected to the output terminal of the fifth flip-flop for receiving the third feedback signal, a clock input terminal for receiving the third clock signal, and an output terminal for outputting a fifth feedback signal;
a fifth feedback generator connected to the output terminal of the first latch for receiving the fifth feedback signal and generating a fifth weighted feedback signal, wherein the fifth feedback generator is connected to the first summer circuit for providing the fifth weighted feedback signal thereto; and
a second latch having an input terminal connected to the output terminal of the first latch for receiving the fifth feedback signal, a clock input terminal for receiving the third clock signal, and an output terminal for outputting a sixth feedback signal;
a sixth feedback generator is connected to the output terminal of the second latch for receiving the sixth feedback signal and generating a sixth weighted feedback signal, wherein the sixth feedback generator is connected to the second summer circuit for providing the sixth weighted feedback signal thereto, whereby the fifth and sixth weighted feedback signals compensate the error in the analog input signal.

11. The DFE of claim 10 further comprising:
a third latch having an input terminal connected to the output terminal of the sixth flip-flop for receiving the fourth feedback signal, a clock input terminal for receiving the fourth clock signal, and an output terminal for outputting a seventh feedback signal;

a seventh feedback generator connected to the output terminal of the third latch for receiving the seventh feedback signal and generating a seventh weighted feedback signal, wherein the seventh feedback generator is connected to the second summer circuit for providing the seventh weighted feedback signal thereto; and a fourth latch having an input terminal connected to the output terminal of the third latch for receiving the seventh feedback signal, a clock input terminal for receiving the fourth clock signal, and an output terminal for outputting an eighth feedback signal;

an eighth feedback generator is connected to the output terminal of the fourth latch for receiving the eighth feedback signal and generating an eighth weighted feedback signal, wherein the eighth feedback generator is connected to the first summer circuit for providing the eighth weighted feedback signal thereto, whereby the seventh and eighth weighted feedback signals compensate the error in the analog input signal.

12. The DFE of claim 11, wherein the first and third weighted feedback signals, the first and sixth weighted feedback signals, the first and seventh weighted feedback signals, the second and fourth weighted feedback signals, the second and fifth weighted feedback signals, the second and eighth weighted feedback signals, the third and fourth weighted feedback signals, the third and fifth weighted feedback signals, the third and eighth weighted feedback signals, the fourth and sixth weighted feedback signals, the fourth and seventh weighted feedback signals, the fifth and sixth weighted feedback signals, the fifth and seventh weighted feedback signals, the sixth and eighth weighted feedback signals, and the seventh and eighth weighted feedback signals have the first predetermined phase difference therebetween.

13. The DFE of claim 11, wherein the first and third latches each comprise a negative level triggered true single phase clock latch.

14. The DFE of claim 11, wherein the second and fourth latches comprise a positive level triggered true single phase clock latch.

15. The DFE of claim 11, wherein the first and second feedback generators multiply the first and second feedback signals with a second offset voltage value to generate the first and second weighted feedback signals, respectively, the third and fourth feedback generators multiply the third and fourth feedback signals with a third offset voltage value to generate the third and fourth weighted feedback signals, respectively, the fifth and seventh feedback generators multiply the fifth and seventh feedback signals with a fourth offset voltage value to generate the fifth and seventh weighted feedback signals, respectively, and the sixth and eighth feedback generators multiply the sixth and eighth feedback signals with a fifth offset voltage value to generate the sixth and eighth weighted feedback signals, respectively.

16. A decision feedback equalizer (DFE), comprising:
a set of summer circuits including first and second summer circuits for receiving an analog input signal, and first, second, third, fourth, fifth, sixth, seventh, and eighth weighted feedback signals and generating first and second intermediate signals, wherein the first summer circuit receives the first, third, fifth, and sixth weighted feedback signals and generates the first intermediate signal, and the second summer circuit receives the second, fourth, seventh, and eighth weighted feedback signals and generates the second intermediate signal;

a first flip-flop having a first input terminal connected to the first summer circuit for receiving the first intermediate signal, a clock input terminal for receiving a first clock signal, a second input terminal for receiving a first offset voltage value, and an output terminal for generating a first compensated signal;

a second flip-flop having a first input terminal connected to the first summer circuit for receiving the first intermediate signal, a clock input terminal for receiving the first clock signal, a second input terminal for receiving an inverted first offset voltage value, and an output terminal for generating a second compensated signal;

a third flip-flop having a first input terminal connected to the second summer circuit for receiving the second intermediate signal, a clock input terminal for receiving a second clock signal, a second input terminal for receiving the first offset voltage value, and an output terminal for generating a third compensated signal;

a fourth flip-flop having a first input terminal connected to the second summer circuit for receiving the second intermediate signal, a clock input terminal for receiving the second clock signal, a second input terminal for receiving the inverted first offset voltage value, and an output terminal for generating a fourth compensated signal, wherein the first and second clock signals have the first predetermined phase difference therebetween;

a first multiplexer having first and second input terminals for receiving the first and second compensated signals, respectively, a select terminal for receiving a first select signal, and an output terminal for outputting at least one of the first and second compensated signals as a first feedback signal;

a first feedback generator connected to the output terminal of the first multiplexer for receiving the first feedback signal and generating the first weighted feedback signal, wherein the first feedback generator is connected to the first summer circuit for providing the first weighted feedback signal thereto;

a second multiplexer having first and second input terminals for receiving the third and fourth compensated signals, a select terminal for receiving a second select signal, and an output terminal for outputting at least one of the third and fourth compensated signals as a second feedback signal;

a second feedback generator connected to the output terminal of the second multiplexer for receiving the second feedback signal and generating the second weighted feedback signal, wherein the second feedback generator is connected to the second summer circuit for providing the second weighted feedback signal thereto;

a fifth flip-flop having a first input terminal connected to the output terminal of the first multiplexer for receiving the first feedback signal, a clock input terminal for receiving a third clock signal, and an output terminal for outputting a third feedback signal, wherein the select terminal of the second multiplexer is connected to the output terminal of the fifth flip-flop for receiving the third feedback signal as the second select signal;

a third feedback generator connected to the output terminal of the fifth flip-flop for receiving the third feedback signal and generating the third weighted feedback signal, wherein the third feedback generator is connected to the second summer circuit for providing the third weighted feedback signal;

a sixth flip-flop having a first input terminal connected to the output terminal of the second multiplexer for receiving the second feedback signal, a clock input terminal for receiving a fourth clock signal, and an output terminal for outputting a fourth feedback signal, wherein the select terminal of the first multiplexer is connected to the output terminal of the sixth flip-flop for receiving the fourth feedback signal as the first select signal;

a fourth feedback generator connected to the output terminal of the sixth flip-flop for receiving the fourth feedback signal and generating the fourth weighted feedback signal, wherein the fourth feedback generator is connected to the first summer circuit for providing the fourth weighted feedback signal;

a first latch having an input terminal connected to the output terminal of the fifth flip-flop for receiving the third feedback signal, a clock input terminal for receiving the third clock signal, and an output terminal for outputting a fifth feedback signal;

a fifth feedback generator connected to the output terminal of the first latch for receiving the fifth feedback signal and generating the fifth weighted feedback signal, wherein the fifth feedback generator is connected to the first summer circuit for providing the fifth weighted feedback signal thereto;

a second latch having an input terminal connected to the output terminal of the first latch for receiving the fifth feedback signal, a clock input terminal for receiving the third clock signal, and an output terminal for outputting a sixth feedback signal;

a sixth feedback generator connected to the output terminal of the second latch for receiving the sixth feedback signal and generating the sixth weighted feedback signal, wherein the sixth feedback generator is connected to the second summer circuit for providing the sixth weighted feedback signal thereto;

a third latch having an input terminal connected to the output terminal of the sixth flip-flop for receiving the fourth feedback signal, a clock input terminal for receiving the fourth clock signal, and an output terminal for outputting a seventh feedback signal;

a seventh feedback generator connected to the output terminal of the third latch for receiving the seventh feedback signal and generating the seventh weighted feedback signal, wherein the seventh feedback generator is connected to the second summer circuit for providing the seventh weighted feedback signal thereto; and a fourth latch having an input terminal connected to the output terminal of the third latch for receiving the seventh feedback signal, a clock input terminal for receiving the fourth clock signal, and an output terminal for outputting an eighth feedback signal;

an eighth feedback generator connected to the output terminal of the fourth latch for receiving the eighth feedback signal and generating the eighth weighted feedback signal, wherein the eighth feedback generator is connected to the first summer circuit for providing the eighth weighted feedback signal thereto, wherein the third and fourth clock signals have the first predetermined phase difference therebetween, wherein the first and third clock signals, and the second and fourth clock signals have a second predetermined phase difference therebetween, wherein the second and third clock signals, and the first and fourth clock signals have a third predetermined phase difference therebetween, and whereby the first, second, third, fourth, fifth, sixth, seventh, and eighth weighted feedback signals compensate an error in the analog input signal.

17. The DFE of claim 16, wherein the first flip-flop includes:
   a latch circuit including first and second inverters cross couple connected to each other, wherein the first inverter generates an inverted intermediate first compensated signal and the second inverter generates an intermediate first compensated signal;
   a first differential transistor pair, connected to the latch circuit, for receiving the first intermediate signal;
   a first transistor having a drain terminal connected to the first differential transistor pair, a source terminal connected to ground, and a gate terminal for receiving the first clock signal;
   a second differential transistor pair, connected to the latch circuit, for receiving the first offset voltage;
   a second transistor having a drain terminal connected to the second differential transistor pair, a source terminal connected to ground, and a gate terminal for receiving the first clock signal;
   a third inverter connected to the first inverter for receiving the inverted intermediate first compensated signal and generating the intermediate first compensated signal;
   a first dynamic latch circuit connected to the third inverter for receiving the intermediate first compensated signal, and an inverted first clock signal, and generating an inverted first compensated signal;
   a fourth inverter connected to the second inverter for receiving the intermediate first compensated signal and generating the inverted intermediate first compensated signal; and
   a second dynamic latch circuit connected to the fourth inverter for receiving the inverted intermediate first compensated signal, and the inverted first clock signal, and generating the first compensated signal;
   a fifth inverter connected to the first dynamic latch circuit for receiving the first compensated signal and generating the inverted first compensated signal; and
   a sixth inverter connected to the second dynamic latch for receiving the inverted first compensated signal and generating the first compensated signal, wherein the fifth and sixth inverters are cross couple connected to each other.

18. The DFE of claim 16, wherein the second flip-flop includes:
   a latch circuit including first and second inverters cross couple connected to each other, wherein the first inverter generates an inverted intermediate second compensated signal and the second inverter generates an intermediate second compensated signal;
   a first differential transistor pair, connected to the latch circuit, for receiving the first intermediate signal;
   a first transistor having a drain terminal connected to the first differential transistor pair, a source terminal connected to ground, and a gate terminal for receiving the first clock signal;
   a second differential transistor pair, connected to the latch circuit, for receiving the inverted first offset voltage value;
   a second transistor having a drain terminal connected to the second differential transistor pair, a source terminal connected to ground, and a gate terminal for receiving the first clock signal;
   a third inverter connected to the first inverter for receiving the inverted intermediate second compensated signal and generating the intermediate second compensated signal;
   a first dynamic latch circuit connected to the third inverter for receiving the intermediate second compensated signal, and an inverted first clock signal, and generating inverted second compensated signal;
   a fourth inverter connected to the second inverter for receiving the intermediate second compensated signal and generating the inverted intermediate second compensated signal; and
   a second dynamic latch circuit connected to the fourth inverter for receiving the inverted intermediate second compensated signal, and the inverted first clock signal, and generating the second compensated signal;
   a fifth inverter connected to the first dynamic latch circuit for receiving the second compensated signal and generating the inverted second compensated signal; and
   a sixth inverter connected to the second dynamic latch for receiving the inverted second compensated signal and generating the second compensated signal, wherein the fifth and sixth inverters are cross couple connected to each other.

19. The DFE of claim 16, wherein the third flip-flop includes:
   a latch circuit including first and second inverters cross couple connected to each other, wherein the first inverter generates an inverted intermediate third compensated signal and the second inverter generates an intermediate third compensated signal;
   a first differential transistor pair, connected to the latch circuit, for receiving the second intermediate signal;
   a first transistor having a drain terminal connected to the first differential transistor pair, a source terminal connected to ground, and a gate terminal for receiving the first clock signal;
   a second differential transistor pair, connected to the latch circuit, for receiving the first offset voltage;
   a second transistor having a drain terminal connected to the second differential transistor pair, a source terminal connected to ground, and a gate terminal for receiving the first clock signal;
   a third inverter connected to the first inverter for receiving the inverted intermediate third compensated signal and generating the intermediate third compensated signal;
   a first dynamic latch circuit connected to the third inverter for receiving the intermediate third compensated signal, and an inverted second clock signal, and generating an inverted third compensated signal;
   a fourth inverter connected to the second inverter for receiving the intermediate third compensated signal and generating the inverted intermediate third compensated signal; and
   a second dynamic latch circuit connected to the fourth inverter for receiving the inverted intermediate third compensated signal, and the inverted second clock signal, and generating the third compensated signal;
   a fifth inverter connected to the first dynamic latch circuit for receiving the third compensated signal and generating the inverted third compensated signal; and
   a sixth inverter connected to the second dynamic latch for receiving the inverted third compensated signal and generating the third compensated signal, wherein the fifth and sixth inverters are cross couple connected to each other.

20. The DFE of claim 16, wherein the fourth flip-flop includes:
- a latch circuit including first and second inverters cross couple connected to each other, wherein the first inverter generates an inverted intermediate fourth compensated signal and the second inverter generates an intermediate fourth compensated signal;
- a first differential transistor pair, connected to the latch circuit, for receiving the second intermediate signal;
- a first transistor having a drain terminal connected to the first differential transistor pair, a source terminal connected to ground, and a gate terminal for receiving the second clock signal;
- a second differential transistor pair, connected to the latch circuit, for receiving the inverted first offset voltage value;
- a second transistor having a drain terminal connected to the second differential transistor pair, a source terminal connected to ground, and a gate terminal for receiving the second clock signal;
- a third inverter connected to the first inverter for receiving the inverted intermediate fourth compensated signal and generating the intermediate fourth compensated signal;
- a first dynamic latch circuit connected to the third inverter for receiving the intermediate fourth compensated signal, and an inverted second clock signal, and generating an inverted fourth compensated signal;
- a fourth inverter connected to the second inverter for receiving the intermediate fourth compensated signal and generating the inverted intermediate fourth compensated signal; and
- a second dynamic latch circuit connected to the fourth inverter for receiving the inverted intermediate fourth compensated signal, and the inverted second clock signal, and generating the fourth compensated signal;
- a fifth inverter connected to the first dynamic latch circuit for receiving the fourth compensated signal and generating the inverted fourth compensated signal; and
- a sixth inverter connected to the second dynamic latch for receiving the inverted fourth compensated signal and generating the fourth compensated signal, wherein the fifth and sixth inverters are cross couple connected to each other.

21. The DFE of claim 16, wherein the fifth and sixth flip-flops, each comprise a true single phase clock flip-flop.

22. The DFE of claim of claim 16, wherein the first predetermined phase difference is 180 degrees and the second predetermined phase difference is 270 degrees.

23. The DFE of claim 16, wherein the first and third weighted feedback signals, the first and sixth weighted feedback signals, the first and seventh weighted feedback signals, the second and fourth weighted feedback signals, the second and fifth weighted feedback signals, the second and eighth weighted feedback signals, the third and fourth weighted feedback signals, the third and fifth weighted feedback signals, the third and eighth weighted feedback signals, the fourth and sixth weighted feedback signals, the fourth and seventh weighted feedback signals, the fifth and sixth weighted feedback signals, the fifth and seventh weighted feedback signals, the sixth and eighth weighted feedback signals, and the seventh and eighth weighted feedback signals have the first predetermined phase difference therebetween.

24. The DFE of claim 16, wherein the first and third latches each comprise a negative level triggered true single phase clock latch.

25. The DFE of claim 16, wherein the second and fourth latches comprise a positive level triggered true single phase clock latch.

26. The DFE of claim 16, wherein the first and second feedback generators multiply the first and second feedback signals with a second offset voltage value to generate the first and second weighted feedback signals, respectively, the third and fourth feedback generators multiply the third and fourth feedback signals with a third offset voltage value to generate the third and fourth weighted feedback signals, respectively, the fifth and seventh feedback generators multiply the fifth and seventh feedback signals with a fourth offset voltage value to generate the fifth and seventh weighted feedback signals, respectively, and the sixth and eighth feedback generators multiply the sixth and eighth feedback signals with a fifth offset voltage value to generate the sixth and eighth weighted feedback signals, respectively.

* * * * *